United States Patent [19]

Banko et al.

[11] Patent Number: 4,957,206

[45] Date of Patent: Sep. 18, 1990

[54] DEVICE FOR STORING A PLURALITY OF DISHES OR THE LIKE IN A PLURALITY OF STACKS

[75] Inventors: Ronald C. Banko, North Wales; Robert J. Cohn, Dallas; John H. Welsch, Moscow, all of Pa.

[73] Assignee: InterMetro Industries Corporation, Wilkes-Barre, Pa.

[21] Appl. No.: 401,503

[22] Filed: Aug. 30, 1989

Related U.S. Application Data

[63] Continuation of Ser. No. 97,836, Sep. 17, 1987, abandoned.

[51] Int. Cl.$^5$ .............................................. A47G 19/00
[52] U.S. Cl. ..................................... 211/40; 211/59.4; 211/194
[58] Field of Search .................... 211/41, 49.1, 59.2, 211/59.3, 59.4, 194, 184, 133, 175; 248/129; 206/499, 506; 220/94 A; 312/42, 43

[56] References Cited

U.S. PATENT DOCUMENTS

| | | | |
|---|---|---|---|
| 641,574 | 1/1900 | Berry | 206/499 |
| 1,240,520 | 9/1917 | Webb | 211/59.4 X |
| 1,916,238 | 7/1933 | Soffel | 211/49.1 X |
| 2,544,053 | 3/1951 | Sharaf . | |
| 2,670,853 | 3/1954 | Schneider | 211/72 X |
| 3,173,546 | 3/1965 | Vershbow | 211/41 |
| 3,190,453 | 6/1965 | Shelley | 211/59.3 |
| 3,512,826 | 5/1970 | Hahn . | |
| 3,661,268 | 5/1972 | Boley | 211/49.1 |
| 3,738,722 | 6/1973 | Kooiman | 211/59.3 X |
| 3,788,487 | 1/1974 | Dawson | 206/499 X |
| 4,083,482 | 4/1978 | Strenczewilk | 206/502 X |
| 4,133,450 | 1/1979 | Beeson et al. | 248/311.2 X |
| 4,364,477 | 12/1982 | Stromberg | 220/94 A |
| 4,415,077 | 11/1983 | Murphy | 211/194 X |
| 4,611,718 | 9/1986 | Cohn et al. | 211/49.1 |
| 4,646,918 | 3/1987 | Liberti | 206/499 |

OTHER PUBLICATIONS

InterMetro Industries Corporation, "'Poker Chip' Dolly Dish", 1985, pp. 1-6.

Primary Examiner—Karen J. Chotkowski
Attorney, Agent, or Firm—Fitzpatrick, Cella, Harper & Scinto

[57] ABSTRACT

A device stores a plurality of dishes or the like in a plurality of stacks, with each stack at an object-receiving region within the device. The device includes a base and a plurality of spaced apart partitions for partitioning the space extending above the base into a plurality of object-receiving regions. The space between the partitions forms a pair of diametrically opposite slits in each object-receiving region. In one embodiment, four generally T-shaped partitions together form four object-receiving regions, and a central open region. In another embodiment, eight partitions, including two corner partitions, four generally T-shaped partitions, and two cross-shaped partitions, form nine object-receiving regions, one of which is a central open region extending above the center of the base. The use of diametrically opposed slits facilitates the loading and unloading of dishes and permits the slits to be relatively narrow so that they occupy a relatively small proportion, about 23% in one embodiment, of the total lateral periphery of the object-receiving regions. Further, the use of an object-receiving region positioned in the center of the device permits the formation of nine object-receiving regions, thereby increasing the number of stacks of dishes that can be stored in the device.

41 Claims, 6 Drawing Sheets

DEVICE FOR STORING A PLURALITY OF DISHES OR THE LIKE IN A PLURALITY OF STACKS

This application is a continuation of application Ser. No. 07/097,836 filed 9/17/87, now abandoned.

BACKGROUND OF THE INVENTION

1. Field of the Invention

The present invention relates to a device for storing a plurality of dishes or the like in a plurality of stacks. This device has particular utility as a dish dolly or cart for storing and transporting dishes of various sizes in institutions, such as hospitals or restaurants. Of course, this device may be utilized to store and transport other dish or saucer shaped objects which are stackable in "poker-chip" fashion.

2. Description of the Prior Art

Devices are known for storing and transporting objects such as dishes. For example, InterMetro Industries Corporation, the assignee of the subject invention, makes and sells various types of such devices. In each one of a series of such devices called "Poker Chip" dish dollies, a number of partitions project vertically from a base to form a plurality of vertically extending column-like regions in which stacks of dishes can be confined. Models identified by numbers T17A44P, T17A24P, T17A40P, T17B44P, T17B24P, T17B40P, T1AN, T1BN, T2AN, T2BN, T3N, T4N, T5N, 18C04P, and T16A in these series may be designed to store, for example, four, eight, ten, or twelve stacks of dishes, depending on the specific model chosen.

However, these models provide only one or two slits in each vertically extending column like region through which the operator can grasp the dishes to place them in the cart or remove them from the cart. In those models in which a stack can only be accessed through one slit, access to the dishes is difficult and time consuming. This is also true of those models having two slits because the slits are usually positioned 90 degrees apart, which also makes it difficult to access the stack of dishes. In order partially to compensate for this difficulty in accessing the dishes, the slits in the partitions are made relatively large. As a result, the dishes are not adequately protected from abuse because a relatively large proportion of the lateral periphery of the dishes is exposed to the exterior of the cart through the slits.

Another disadvantage of these dollies is that a certain amount of space is wasted because a partition is placed at the center of the dolly, thereby preventing dishes from being stacked in that region. For example, model number T4N discussed above, is partitioned into nine areas; however, only eight of these areas are used for stacking dishes. The ninth area is taken up by a partition at the center of the cart. This central partition wastes valuable space that could otherwise be used to store dishes. Consequently, a larger number of dollies must be used than would otherwise be necessary when the number of stacks of dishes exceeds the number of vertically extending column like regions in the dolly by one. This is particularly disadvantageous in many settings such as hospitals and restaurants, where floor space is at a premium.

Other dish dollies, which suffer the sam( disadvantages described above are also offered by Cambro Manufacturing Company, Precision Metal Products, Inc., and Crescent Metal Products. For example, the Cambro Dish Cart Model DC 975 is a one piece double wall polyethelene dish cart that can accommodate four stacks of dish(s. Each stack has only one relatively large slit therein. Precision Metal Products, Inc. models DC-226, DC-231, DC-126, and DC-131 are dollies with one or two compartments adapted to hold three stacks of dishes each without partitions between the three stacks. One side of the compartment is completely open. Model DCAS-4 from Precision Metal Products, Inc. is a dolly divided into four sections by a centrally disposed cross shape partition, having adjustable dividers in each section that can be moved to accommodate 1, 2, or 3 stacks of dishes in each section. Dish dollies in the 501 series from Crescent Metal Products comprise a number of different dish carts, each using a central partition. Some of the dollies in the 501 series also use, in addition, adjustable partitions for accommodating different number of stacks of dishes.

In each of the models from the companies noted above, the region for holding stacks of dishes either has one side that is completely open, thereby providing little protection for the dishes, or has only one or two slits which are positioned so that it is difficult for the operator to remove or place dishes in the dolly, and which are sized so that they do not adequately protect the dishes. Further, each of these models include a central partition that extends through the center of the cart, thereby preventing an additional stack of dishes from being placed at the center of the dolly. As a result, in order to accommodate a large number of stacks, more dollies must be used than would otherwise be necessary if the center of the dollies were free to hold another stack of dishes.

Other stands or containers for holding a plurality of stacked elements are described in U.S. Pat. No. 2,972,421 and U.S. Pat. No. 2,670,853. However, these stands also suffer from the same apparent disadvantages described above.

Finally, other types of partitioned containers, such as those described in U.S. Pat. Nos. 3,661,268 and 2,454,858 directed to storage stands for garment hangers and U.S. Pat. No. 943,714 relating to a partitioned drawer, are even less well adapted to hold stacks of objects, such as dishes.

Thus, there is a need for a dolly for storing a plurality of dishes or similar objects in a plurality of object-receiving regions that permits easy access to the dishes while simultaneously providing maximum protection for the dishes. There is also a need for a dolly that uses its central portion to accommodate a stack of dishes.

SUMMARY OF THE INVENTION

Accordingly, it is an object of the present invention to provide a device for storing a plurality of dishes or similar objects in a plurality of stacks that overcomes the apparent disadvantages of known prior art devices described above.

It is an additional object of the present invention to provide a device for storing objects such as dishes or the like in stacks, in a plurality of object-receiving regions, in which the dishes or the like can be stored and removed easily, while nevertheless enclosing the lateral periphery of the dishes to a sufficiently large extent to protect them from abuse.

It is a further object of the present invention to provide a device for storing dishes or the like that permits ready accessibility to the dishes and protects them from abuse, while at the same time holding a maximum number of stacks of dishes in the device.

In accordance with the preferred embodiments, the present invention is a device for storing a plurality of dishes or similar objects. The device includes a structure such as a base for supporting the plurality of objects, and a structure for partitioning the space extending above the base into a plurality of object-receiving regions. The partitioning structure has one pair of slits in each object-receiving region. The slits in each pair are spaced substantially diametrically opposite from each other in each object-receiving region. In one embodiment, the partitioning structure includes four spaced apart generally T-shaped partitions, each having two surfaces which form the periphery of different object-receiving regions. The four partitions together form four object-receiving regions, each bounded by a pair of spaced apart surfaces from different partitions. The spaces between the pair of surfaces defining each object-receiving region form two slits on substantially diametrically opposite sides of each object-receiving region. The partitions are spaced apart so that one slit in each pair in each object-receiving region extends directly above one corner of the base. In addition, each partition is spaced from an axis extending through and perpendicular to the center of the base so as to form a central open region in the center of the device. The other slit in each object-receiving region opens onto this central open region.

Because the slits in each object-receiving region are substantially diametrically opposite each other, it is easy for the operator to load and unload dishes into the object-receiving regions by grasping the dishes from opposite sides. This easy accessibility of the dishes in each object-receiving region permits the slits to occupy a relatively small proportion of the total lateral periphery of the object-receiving regions. Thus, in one embodiment, it is possible for the partitions to enclose at least 60% of the lateral periphery of the object-receiving regions, with the slits together occupying no more than 40% of the lateral periphery of the object-receiving regions. In another embodiment, the partitions extend over at least 75% of the lateral periphery of the object-receiving regions, with the slits together occupying no more than 25% of the lateral periphery of the object-receiving regions. Therefore, the objects stored in the device are protected to a great extent from abuse, due to the relatively small portion of the lateral periphery of the object-receiving regions that are open to the exterior through the slits.

In another embodiment, the partitioning structure partitions the space extending above the base into nine object-receiving regions, one of which extends through and surrounds an axis perpendicular to the base and extending through the center of the base. Each object-receiving region has a pair of slits, with the characteristics noted above. Each object-receiving region also has substantially the same size and shape and is formed by two object-receiving region-defining surfaces from different partitions.

The partitioning structure in this embodiment comprises six exterior partitions, which define the exterior walls of the device. Two of the exterior partitions are corner partitions which extend upwardly from opposite corners of the base and comprise one object-receiving region-defining surface. Four of the exterior partitions are spaced from the other corners of the base and each comprises two object-receiving region-defining surfaces. Also provided are two generally cross shaped interior partitions. Each interior partition comprises four object-receiving region-defining surfaces. Because each object-receiving region is defined by two object-receiving region-defining surfaces of different partitions and because this embodiment has eighteen such surfaces, the partitioning structure forms nine object-receiving regions. One of these regions is central and open, extending above the center of the base.

Due to the positioning of one of the object-receiving regions above the center of the base, it is possible to provide nine equally sized object-receiving regions in the device, thereby accommodating a maximum number of stacks of dishes in a minimum amount of space.

Finally, each of the embodiments noted above may also include means for stabilizing the plurality of dishes stacked in the object-receiving regions. This stabilizing means can comprise a plurality of vertical stabilizing fins projecting from each object-receiving region-defining surface toward the center of each object-receiving region.

Thus, the device of the present invention provides a simple and elegant, yet significant improvement over known dish dolly devices.

These and other objects of the present invention will be understood from the following detailed description provided below in conjunction with the accompanying drawing.

DETAILED DESCRIPTION OF THE PREFERRED EMBODIMENTS

Figure 12:
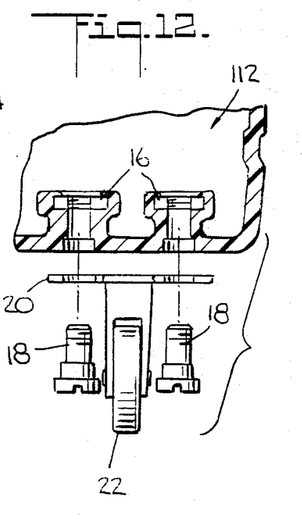
FIG. 12 is an enlarged detailed view of an encircled portion XII in FIG. 11 of the second embodiment of the present invention and may be equally will adapted to the first embodiment.

Two preferred embodiments of the present invention are illustrated in the drawing. FIGS. 1 to 6, illustrate a first preferred embodiment, in which the device is designed to accommodate four stacks of objects, such as dishes or the like, that are of equal size and shape, and FIGS. 7 to 13 illustrate a second embodiment in which the device is designed to accommodate nine stacks of objects that are of equal size and shape. FIG. 12 illustrates a wheel structure for the second embodiment that may be utilized in the first.

This device has particular utility in hotels, restaurants, and other institutions, but may be used with equal advantage to store other dish or saucer like objects that are round, oval, or a large number of other shapes. For convenience, however, the preferred embodiment of the present invention will be described with reference to the storage of dishes.

Referring now to the first embodiment illustrated in FIGS. 1 to 6, the device of the present invention is generally indicated at 10 and includes a square, flat, horizontally extending base 12 with rounded corners.

Cart 10 comprises one unitary piece that can be composed, for example, of a seamless one piece double-wall unit of polyethylene with a foamed in-place core for structural strength. The cart in the preferred embodiment is produced by rotational molding of polyethylene. However, it is within this scope of the invention to rotationally mold the device out of another material, or to produce the unitary structure by a method other than rotational molding. Further, it is within the scope of the present invention to produce the cart 10 as a non-unitary but integral structure in which base 12 is attached by suitable means to the partitions discussed in detail below.

Figure 1:
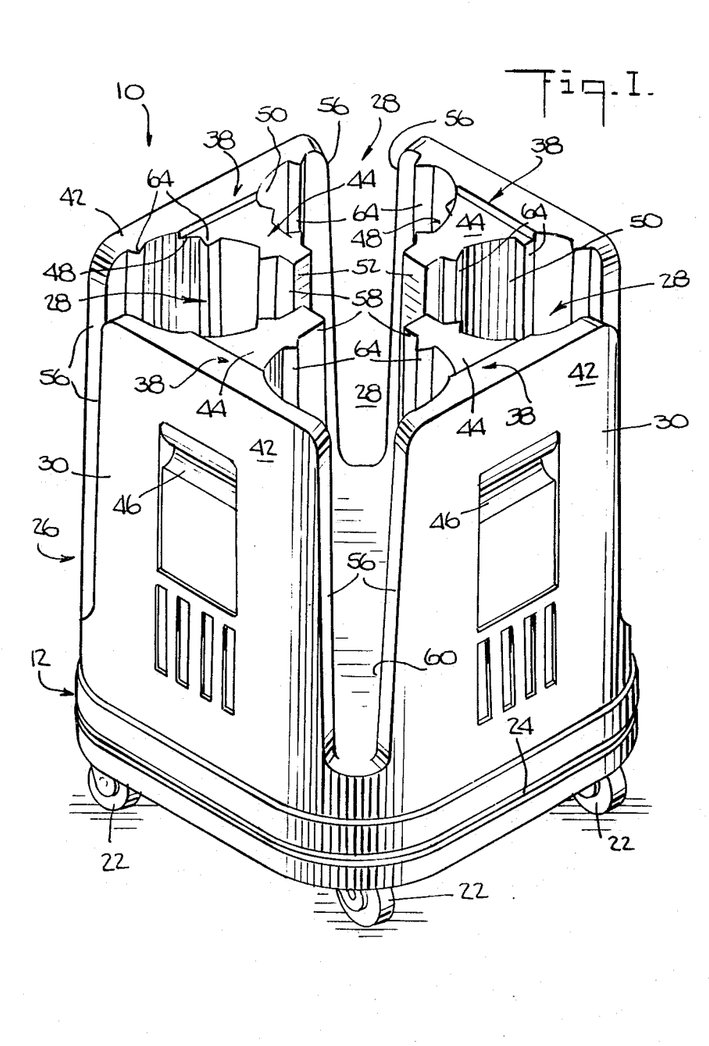
FIG. 1 is a perspective view of a first embodiment of the present invention, which can accommodate four stacks of objects.
Figure 2:
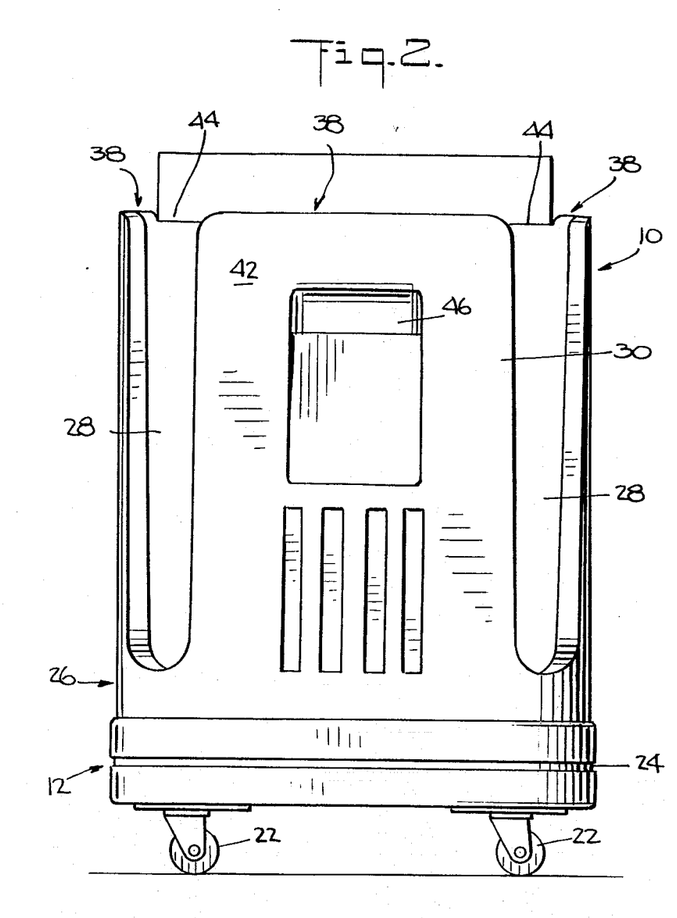
FIG. 2 is a side elevational view of the first embodiment of the present invention illustrated in FIG. 1.

The outer surface of the base includes a portion that is recessed to form a band 24 which extends completely around the base periphery. Because the portion above the base is recessed with respect to the base, base 12 forms two projecting bands above and below recess band 24 as illustrated in FIGS. 1 and 2.

Figure 4:
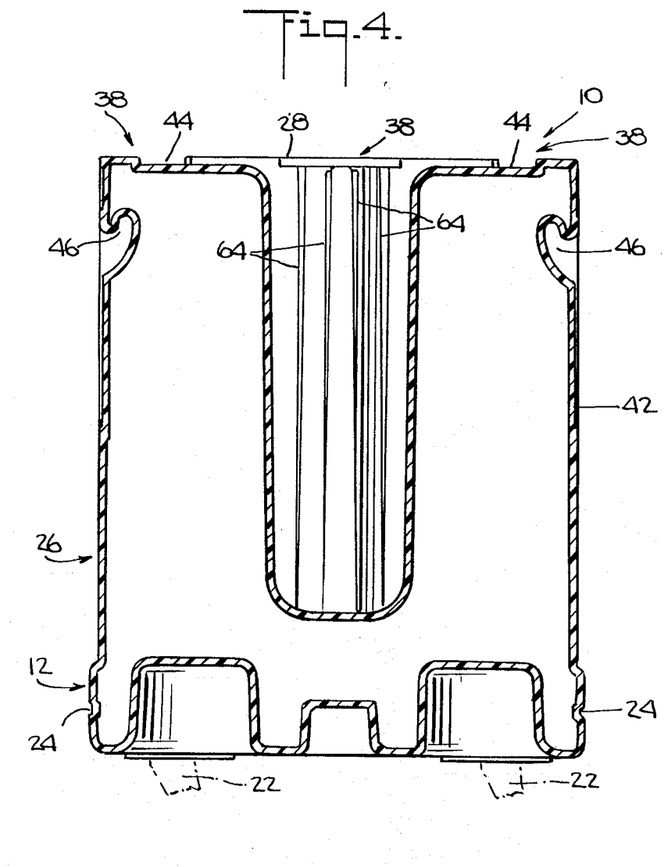
FIG. 4 is a vertical transverse cross sectional view of the first embodiment of the present invention taken along plane 4—4 in FIG. 3.
Figure 5:
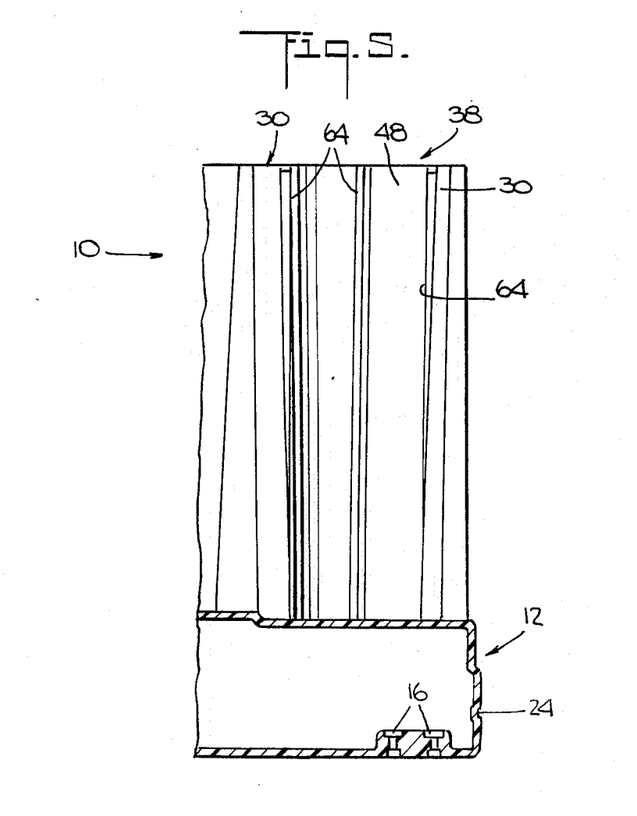
FIG. 5 is a vertical fragmentary cross-sectional view of the first embodiment of the present invention taken along plane 5—5 in FIG. 3.
Figure 6:
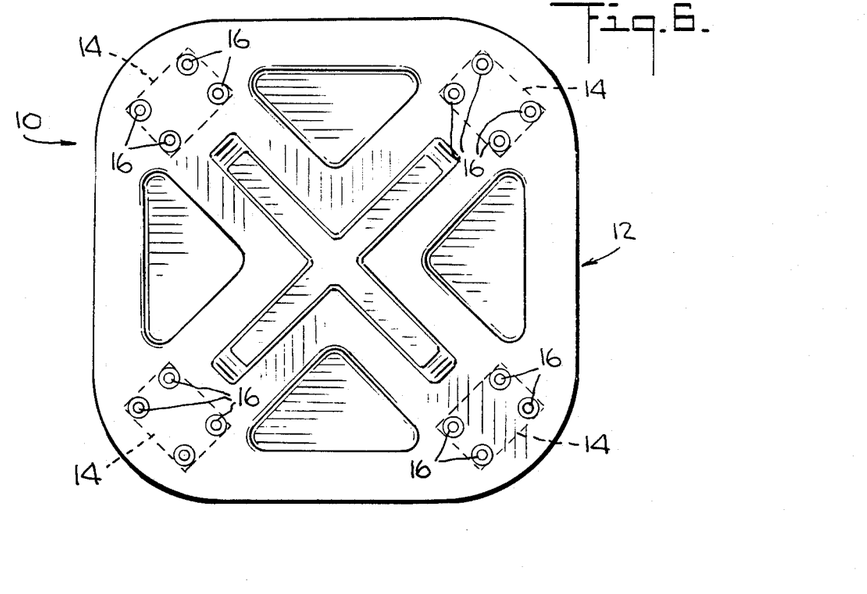
FIG. 6 is a bottom view of the first embodiment of the present invention illustrated in FIG. 1, in which wheels, ordinarily provided, have been removed for sake of illustration.

Base 12 has four triangular recesses 25 in the bottom thereof, and a T-shaped recess extending between the four triangular recesses that are illustrated in FIGS. 4 and 6. The top surface 27 of base 12 forms a floor for supporting the objects such as dishes, which are stacked thereon. The structure defining the regions adapted to receive the separate stacks of dishes will now be described.

The cart 10 further includes structure 26 for partitioning the space extending above base 12 into a plurality of substantially vertically extending object-receiving regions 28. Partitioning structure 26 forms one unitary body with base 12. In the embodiment illustrated in FIGS. 1 to 6, each object-receiving region 28 has substantially the same size and shape, i.e. cylindrical, with a substantially circular horizontal cross-sectional shape. These object-receiving regions are adapted to receive a plurality of stacked objects, such as dishes, which will rest on the floor 27 of base 12.

Partitioning structure 26 comprises four generally T-shaped partitions 30 that extend generally perpendicularly but taper upwardly and inwardly from base 12.

Also provided are rack-retaining structures 38 on the top surface of each partition for retaining a plurality of stacked racks, which are shown in dashed lines at the top of FIG. 2, positioned on top of the device. Rack retaining structure 38 comprises the top surfaces of a first portion 42 and a second portion 44 of each partition. First portion 42 is raised with respect to second portion 44, and can be clearly seen in FIGS. 1, 2, and 4.

As result of this structure, when dishes are stacked in each of the four object-receiving regions 28, racks for carrying these dishes can be stacked on top of device 10, saving additional space.

First portion 42 comprises one outer wall of device 10. Each first portion 42 of each partition 30 also includes a handle 46 of sufficient size to accommodate the user's hand thereon so that the cart may be lifted or otherwise manipulated for movement. Handle 46 is a recess in first portion 42. The recess is formed by a wall which is inclined at 60° with respect to the plane passing through the outer wall of first portion 42 to provide for mold clearances.

Figure 3:
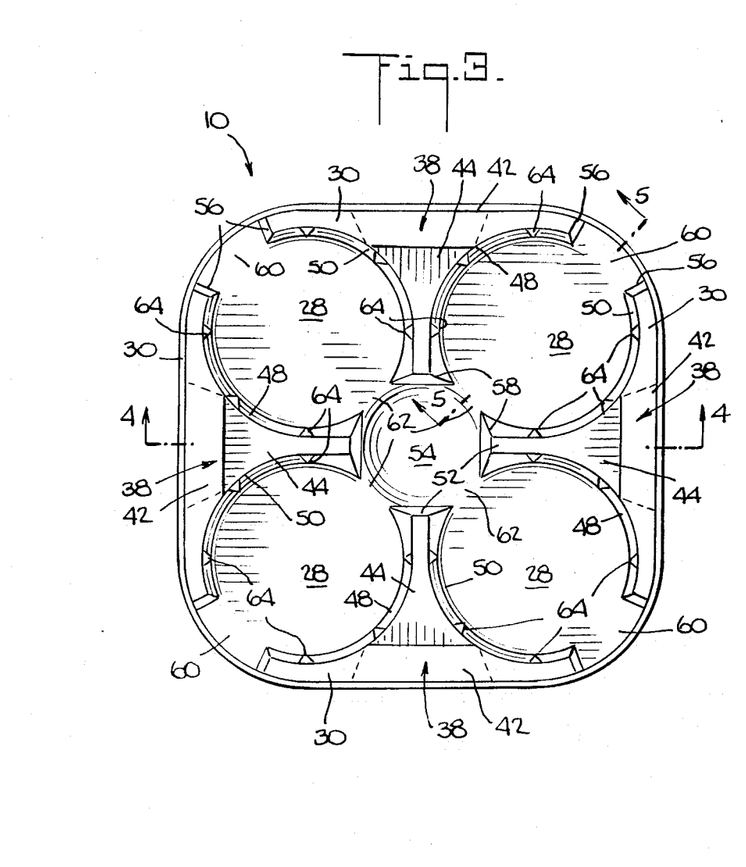
FIG. 3 is a top plan view of the first embodiment of the present invention illustrated in FIG. 1.

Portion 44 of each generally T-shaped partition 30 projects inwardly from the first portion 42 toward an axis extending through the center of and perpendicular to base 12 and comprises two object-receiving region-defining surfaces 48 and 50. Surface 48 defines a portion of the boundary of one region 28 and surface 50 of the same partition defines a portion of the boundary of an adjacent region 28. Further, the boundary of each object-receiving region is defined by a pair of object-receiving region-defining surfaces from different partitions, as illustrated in FIGS. 1 and 3. The horizontal cross-section of surfaces 48 and 50 has the shape of a partial circle.

In the embodiment illustrated in FIGS. 1 to 6, partitions 30 extend upwardly, substantially perpendicular to base 12 and the outer walls of adjacent first portions 42 of partitions 30 extend substantially perpendicular to each other. Each second portion 44 comprises an end 52 connecting surfaces 48 and 50. Ends 52 face but are spaced from the above mentioned axis. As a result, a central open region 54 is formed that is clearly illustrated in FIG. 3 and the axis is a longitudinal axis of symmetry of region 54.

Each object-receiving region-defining surface 48 and 50 also comprises an outer end 56 adjacent the outer wall, and an inner end 58 spaced inwardly from the outer end and adjacent end 52. Each object-receiving region 28 is defined by and comprises a pair of object-receiving region-defining surfaces of different partitions whose outer ends 56 are spaced apart to define a first slit 60. The inner ends 58 of each pair of object-receiving region-defining surfaces defining one region 28 are also spaced apart to define a second slit 62. This second slit 62 borders and opens onto central open region 54.

Central open region 54 and slits 62 are large enough to accommodate a person's arm and hand to permit her or him to grasp a dish or a stack of dishes stacked in any object-receiving region 28. Further, each slit 60 extends directly above a different corner of base 12. As a result, in each preferred embodiment the slits in each object-receiving region 28 are substantially diametrically opposite from each other. Further, the slits into each object-defining region extend substantially symmetrically on either side of a vertical plane extending through the center of each slit and through the center of the object-receiving region, for example, as illustrated by plane 5—5 in FIG. 3.

Because the slits of each object-receiving region 28 are diametrically opposite each other, dishes stacked in such region can easily be removed by the operator by reaching with one hand down through central open region 54 and slot 62 to grasp the stack of dishes on one side, while the other hand grasps stack of dishes on the opposite side through slot 60. Because the use of a pair of diametrically opposed slits renders it easy to remove a stack of dishes, the slits 60 and 62 can be made relatively narrow, thus increasing the protection for the dishes. In the embodiment illustrated in FIGS. 1 to 6, the object-receiving region-defining surfaces 48, 50 preferably enclose about 75% of the lateral periphery of each object-receiving region 28, with each pair of slits 60 and 62 together extending over not more than about 25% of the lateral periphery of the object-receiving region 28.

Three vertical stabilizing fins 64 extend along substantially the entire vertical length of partition 30 in each surface 48 and 50 and project toward a longitudinal axis which extends perpendicular to base 12 and upwardly through the center of the object-receiving region 28. Thus, each region 28 has six such fins 64. These fins 64 stabilize the dishes stacked in each region 28 and, in each region 28, the three fins on each object-receiving region-defining surface are spaced apart by substantially equal distances. Further, the stabilizing fins 64 are substantially parallel to one another and have a substantially triangular cross-sectional shape, in which each lateral side of each fin preferably forms a 45 degree angle with respect to surfaces 48 or 50.

Base 12, as more clearly seen in FIG. 6, also has four molded-in mounting base plates 14 that can be composed of metal. Each base plate 14 includes four threaded anchors 16 each adapted to receive a threaded bolt 18 that extends through openings in a caster plate 20 as illustrated in FIG. 12, which shows structure utilized with equal advantage in the first embodiment described above and the second embodiment described below. Each caster plate 20 has secured thereto one caster wheel 22 for supporting the cart for movement along a floor.

A second embodiment of the present invention is illustrated in FIGS. 7 to 13. All of the features noted above with respect to the first embodiment illustrated in FIGS. 1 to 6, are also found in this embodiment except for the number and placement of object-receiving regions, the number and shape of the partitions. Thus, for example, the second embodiment has stabilizing fins, two diametrically opposed slits in each object-receiving region, partitions which form one unitary body with a base, four caster plates and a four base plates, tray retaining means, and a central open column. In addition, each outer wall of the cart has recess which functions as a handle to accommodate the user's hand therein; however, rather than being inclined by 60° with respect to the outer wall of the cart, as is the case in the first embodiment, the recess is inclined by 70° with respect to the outer walls of the cart in the second embodiment.

More specifically, the embodiment illustrated in FIGS. 7 to 13 comprises a cart 110 having a square, flat, horizontally extending base 112 with rounded edges. Base 112, as clearly seen in FIGS. 11 and 13, has four molded-in mounting base plates 114, each with four threaded anchors 116. The structural arrangement and mounting of casters 22 is the same as that described with respect to the embodiment illustrated in FIGS. 1 to 6.

Cart 110 is a unitary piece which can be composed, for example, of a seamless one piece double wall unit of polyethylene with a foamed-in placed core for structural strength. The cart in this embodiment is also preferably produced by rotational molding of polyethylene. However, it is within the scope of the present invention to produce this cart and the cart of the other embodiment by other means, such as blow molding, structural foam molding, and reaction injection molding.

Figure 7:
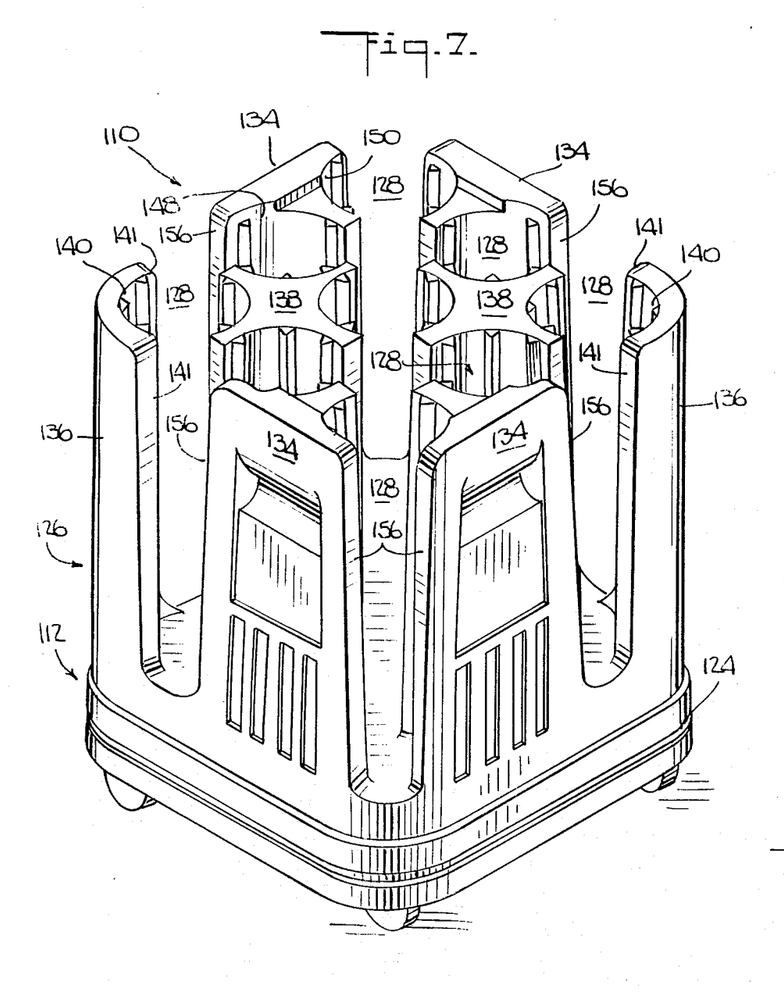
FIG. 7 is a perspective view of a second embodiment of the present invention which can accommodate nine stacks of objects.
Figure 8:
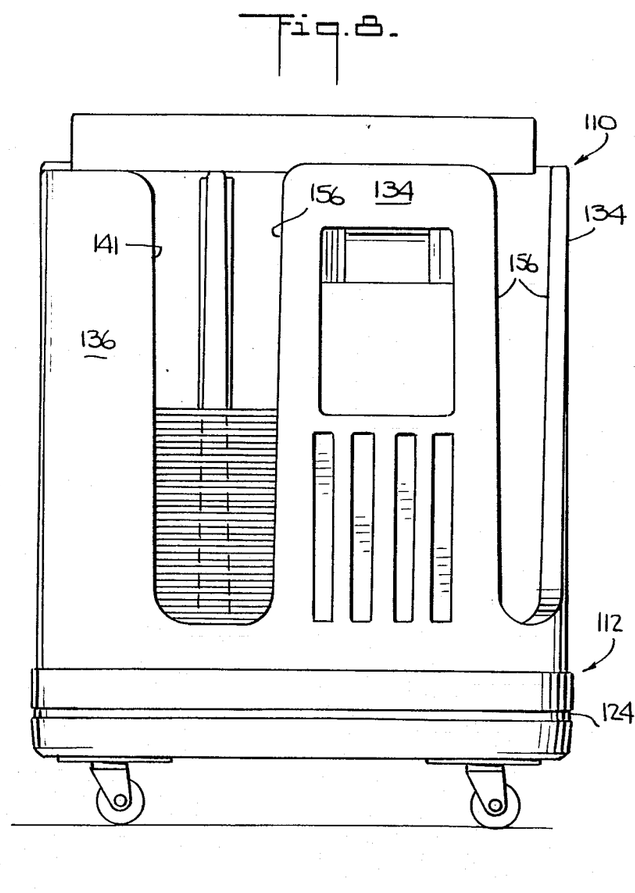
FIG. 8 is a side elevational view of the second embodiment of the present invention illustrated in FIG. 7.

The outer surface of base 112 includes a portion which is recessed in a band 124 which extends completely around the periphery of the base, as illustrated in FIGS. 7 and 8.

Figure 10:
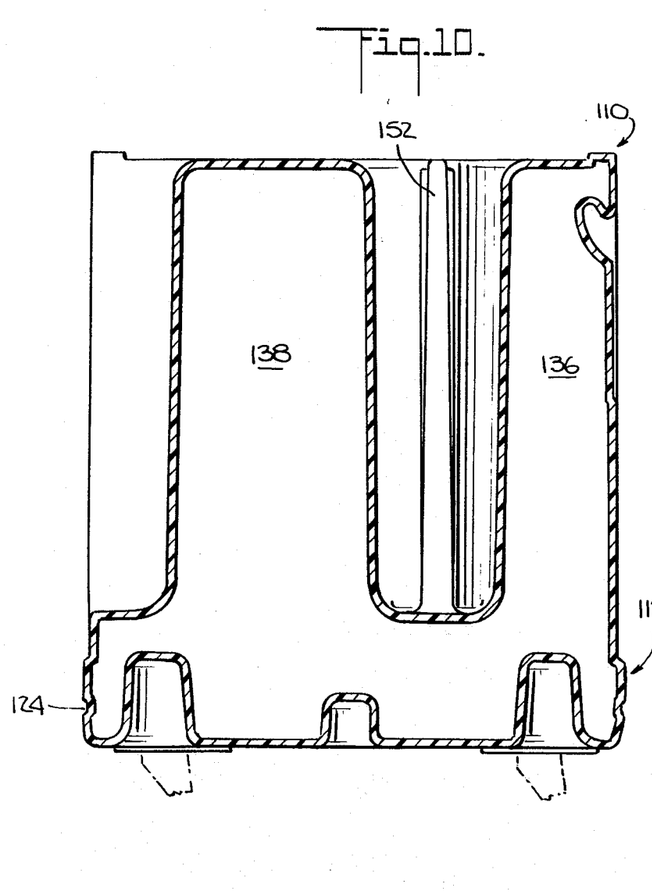
FIG. 10 is a vertical transverse cross-sectional view, taken along plane 10—10 in FIG. 9, of the second embodiment of the present invention.
Figure 11:
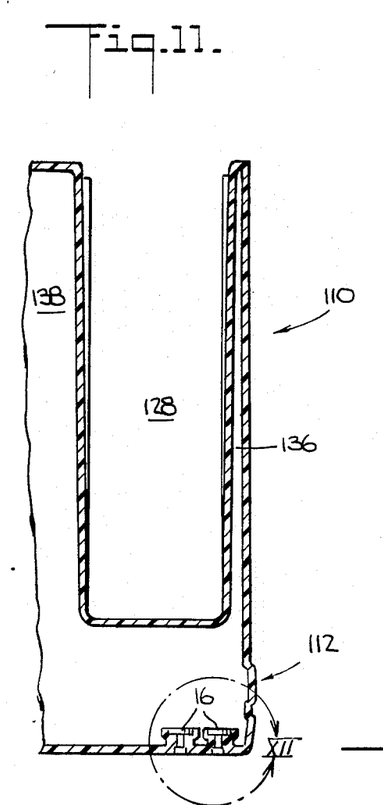
FIG. 11 is a vertical fragmentary cross-sectional view, taken along plane 11—11 in FIG. 9, of the second embodiment of the present invention.
Figure 13:
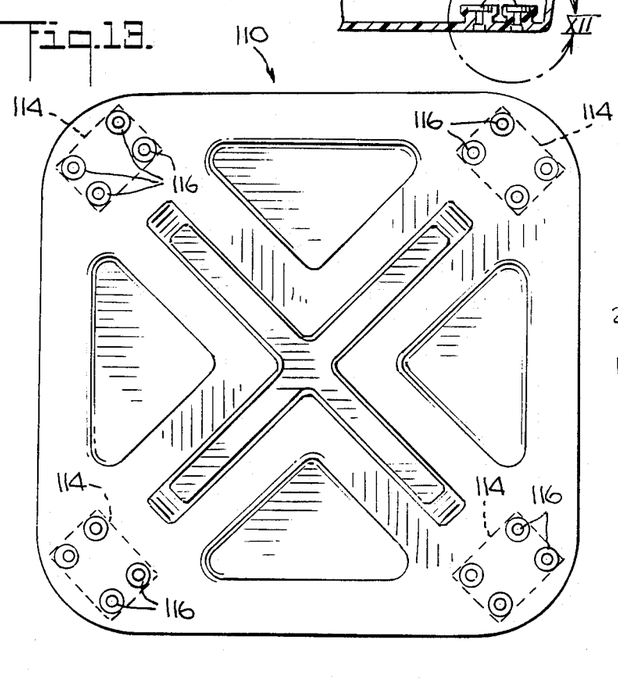
FIG. 13 is a bottom view of the second embodiment of the present invention illustrated in FIG. 7.

Base 112 has four triangular recesses in the bottom thereof, and a T-shaped recess extending between the triangular recesses, which are illustrated in FIGS. 10 and 13. The top surface of base 112 forms a floor for supporting dishes that are stacked thereon in nine object-receiving regions. A stack of dishes in one region is represented by horizontal lines in FIG. 8. The structure which defines each of these object-receiving regions will now be described.

A structure 126 partitions the space extending above base 112 into nine substantially vertically extending object-receiving regions 128. Each object-receiving region 128 has substantially the same size and shape, and substantially the same cross-sectional shape. However, it is within the scope of the present invention for these regions to have any other shape, and to be different sizes and shapes from each other. Regions 128 are adapted to receive a plurality of stacked objects that rest on the floor, i.e. the top surface, of base 112.

Partition-defining structure 126 comprises eight partitions that extend upwardly, substantially perpendicular to base 112. Unlike the embodiment illustrated in FIGS. 1 to 6, these partitions do not all have the same shape. Rather, the partitions comprise six exterior partitions and two interior partitions. The six exterior partitions together form the outer walls of device 110. The exterior partitions include four generally T-shaped partitions 134 and two corner partitions 136. Corner partitions 136 extend upwardly from opposite corners of base 112. The generally T-shaped partitions 134 each comprise a first portion constituting an outer wall of cart 110 and a second portion constituting two object-receiving region-defining surfaces 148 and 150, each of which defines a portion of a different object-receiving region 128. In the second embodiment these object-receiving surfaces have partially circular a cross-section. However, it should be noted that the invention is not limited to such cross-sectionally shaped object-receiving region-defining surfaces, but includes surfaces of any shape.

Figure 9:
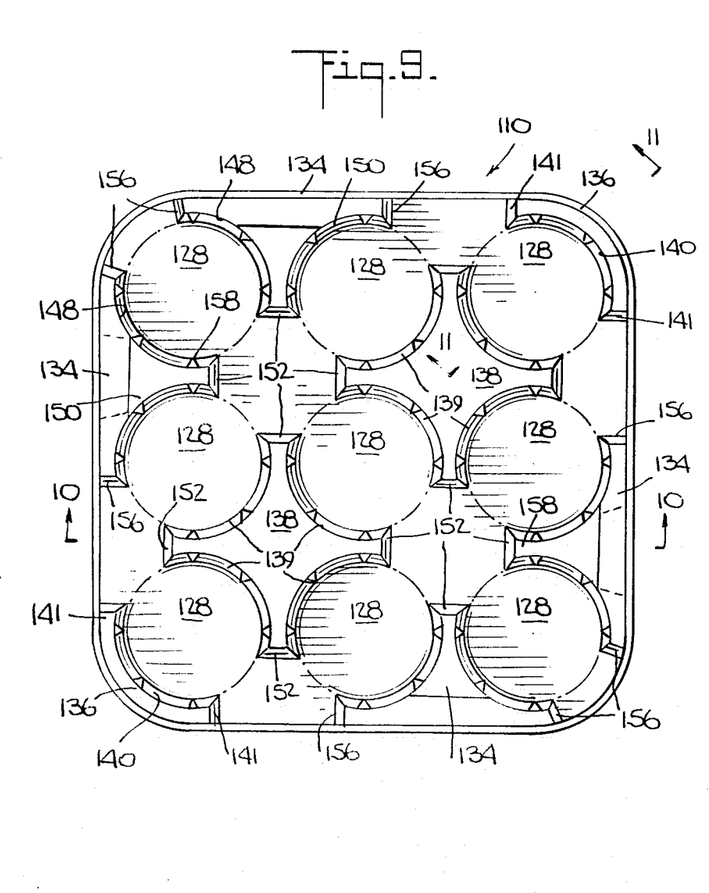
FIG. 9 is a top plan view of the second embodiment of the present invention illustrated in FIG. 7.

Each object-receiving region-defining surface of each generally T-shaped partition 134 has an outer end 156 and an inner end 158, as illustrated in FIG. 9. Outer end 156 is adjacent the outer wall of the T-shaped partition, and inner end 158 is adjacent an end 152 of partition 134 which connects surfaces 148 and 150. In contrast, the two corner partitions 136 each comprise one object-receiving region-defining surface 140 having two outer ends 141.

Each interior partition 138 is spaced from the outer edge of base 112, and is generally cross shaped so as to define four object-receiving region-defining surfaces 139. Each inner partition 138 also comprises four ends 152 which separate two adjacent object-receiving region-defining surfaces.

Each of the eight partitions are spaced apart from each other in such a way that each region 128 comprises two diametrically opposed slits so as to permit easy access to the stacked dishes. More specifically, the four generally T-shaped exterior partitions 134 are grouped in pairs so that each pair is spaced on either side of one corner of base 112. As seen in FIGS. 7 and 9, one partition 134 in the pair of partitions has one of its outer ends 156 spaced from the outer end 156 of the other partition 134 in the pair so as to form a slit extending vertically directly above one corner of base 112. The other outer end 156 of each partition in each pair of generally T-shaped partitions 134 is spaced from an end 152 of an interior partition 138, so as to form another slit for another object-receiving region 128. Similarly, ends 141 of each corner partition 136 are spaced from ends 152 of an interior partition 138 so as to form two slits in the object-receiving regions defined by partitions 136 and 138.

As noted above, each object-receiving region 128 is bordered by and is defined by two object-receiving region-defining surfaces of different partitions. Further, each object-receiving region comprises a pair of slits which are on diametrically opposite sides thereof, and which extend symmetrically on either side of one vertical plane extending through the center of each slit in the pair and through the center of the object-receiving region associated with the pair. The use of eight partitions comprising four generally T-shaped partitions positioned in pairs on either side of two corners and having two object-receiving region-defining surfaces, two interior cross shaped partitions having four object-receiving region-defining surfaces, and two corner partitions each having one object-receiving region-defining surface, permits the formation of nine object-receiving regions, with one region 128 centered on an axis perpendicular to base 12 and extending through the center of base 12. In other words, this central object-receiving region 128 doubles as the central open region of the device. Because this second embodiment permits the use of nine separate object-receiving regions, a large number of stacks can be accommodated in device 110 in a minimum amount of space. Further, in view of the use of two opposing slits in each region 128, the object-receiving region-defining surfaces can preferably enclose about 60% of the lateral periphery of each object-receiving region, with the pair of slits together extending over no more than about 40% of the lateral periphery of each object-receiving region.

As a result, the present invention provides an efficient and convenient means for storing dishes in a minimum amount of space while simultaneously providing maximum. protection and easy access to teh dishes. Thus, the present invention provides significant advantages over known prior devices from many points of view.

Accordingly, although two preferred embodiments of the present invention have described above in detail, it is to be understood that this description is only for purposes of illustration. Modifications may be made to the device for storing objects, such as dishes or the like, in a plurality of stacks in order to adapt it to particular applications.

What is claimed is:

1. A device for storing a plurality of objects, such as dishes or the like, in a plurality of stacks each at an object-receiving region therein, said device comprising:
   means for supporting said plurality of objects and including a generally rectangular base having four corners, and
   means, comprising four generally T-shaped partitions each extending upwardly from said base, for partitioning the space extending above said base into four object-receiving regions, wherein said partitioning means defines a pair of slits therein adjacent each said object-receiving region, wherein said slits in each said pair are spaced substantially diametrically opposite from each other relative to one said object-receiving region, and wherein one said slit is positioned directly above each of at least two diagonally opposed corners of said base.

2. The device defined by claim 1, wherein each slit extends substantially symmetrically on either side of a vertical plane extending through the center of said slits and through the center of said at least one object-receiving region.

3. The device defined by claim 1, wherein said partitioning means partitions the space extending above said base into four object-receiving regions and has four pair of slits, one pair in each object-receiving region, and wherein one of said slits in each pair is positioned directly above a different corner of said base.

4. The device defined by claim 1, wherein the portion of said partitioning means defining each said object-receiving region encloses about 60% of the lateral periphery of that said object-receiving region and said pair of slits together extend over no more than about 40% of said lateral periphery of that said object-receiving region.

5. The device claimed by claim 1, wherein that portion of said partitioning means defining each said object-receiving region enclosed about 75% of the lateral periphery of that said object-receiving region and said pair of slits together extend over not more than about 25% of the lateral periphery of that said object-receiving region.

6. The device defined by claim 1, wherein said partitioning means and said supporting means comprise one unitary body.

7. The device defined by claim 1, further comprising rack retaining means for retaining a plurality of stacked racks positioned on top of said device, said rack retaining means being positioned on the top surface of said partitions and comprising the upper surface of at least two partitions, each upper surface comprising a first portion and a second portion of a height lower than said first portion.

8. The device defined by claim 1, wherein each partition comprises first and second portions, wherein said first portion comprises one outer wall of said device, wherein said second portion projects inwardly from said outer wall and comprises two object-receiving region-defining surfaces, and wherein the boundary of each object-receiving region is defined by a pair of said surfaces of different partitions.

9. The device defined by claim 8, wherein said object-receiving regions have a substantially circular horizontal cross-sectional shape and said two surfaces of each second portion have a partially circular shape in horizontal cross-section.

10. The device defined by claim 8, wherein said first portions of adjacent partitions extend substantially perpendicularly to each other.

11. The device defined by claim 8, wherein each second portion comprises means for stabilizing objects stacked in said object-receiving region associated with said second portion.

12. The device defined by claim 11, wherein said stabilizing means comprises three stabilizing fins extending vertically upwardly from said base and projecting inwardly from each object-receiving region-defining surface and spaced apart from each other by substantially equal distances.

13. The device defined by claim 12, wherein each object-receiving region has a substantially circular shaped horizontal cross-section.

14. The device defined by claim 8, wherein said second portions of each partition extend from said first portion toward an axis extending perpendicular to said base and through said center of said base, wherein each second portion comprises an end connecting said two object-receiving region-defining surfaces and facing said axis, wherein said ends of each second portion in a pair of objectreceiving region-defining surfaces are spaced from each other so as to form said pair of slits in each object-receiving region, wherein said end of each second portion is spaced from said axis so as to form said central open region surrounding said axis, and bounded by said ends of said second portions of said partitions, and wherein said central open region is sufficiently large so as to accommodate a user's hand and arm reaching through said central open region to grasp an object in a stack of objects in any of said object-receiving regions.

15. The device defined by claim 8, wherein each object-receiving region-defining surface of said second portion comprises an outer end adjacent said outer wall and an inner end spaced inwardly from said outer end, wherein each of said pairs of surfaces defining the boundary of each object-receiving region comprise two object-receiving region-defining surfaces of different partitions whose outer ends are spaced apart to define one of said slits and whose inner ends are spaced apart to define the other of said slits, wherein said base comprises four corners, and wherein said slits defined by said outer ends extend above said corners.

16. A device for storing a plurality of objects, such as dishes or the like, in a plurality of stacks each in an object-receiving region therein, said device comprising:
means for supporting said plurality of objects and including a generally rectangular base having four corners;
means for partitioning the space extending above said base into at least four object-receiving regions, wherein said partitioning means defines a pair of slits therein adjacent each said object-receiving region, wherein said slits in each said pair are spaced substantially diametrically opposite from each other relative to one said object-receiving region, wherein one said slit is positioned directly above each of at least two diagonally opposed corners of said base, wherein said partitioning means further defines one of a central open region and an object-receiving region above the center of said base, and wherein said partitioning means further comprises an object-receiving region-defining surface for each said object-receiving region; and
means for stabilizing a plurality of objects stacked in each said object-receiving region, said stabilizing means projecting from said object-receiving region-defining surfaces.

17. The device defined by claim 16, wherein said stabilizing means comprises a plurality of stabilizing fins projecting toward a longitudinal axis extending through the center of an associated one of said object-receiving regions.

18. The device defined by claim 17, wherein said stabilizing means comprises six stabilizing fins spaced apart from each other for each said object-receiving region.

19. The device defined by claim 17, wherein each stabilizing fin is substantially mutually parallel to all others thereof, and wherein said plurality of stabilizing fins extend vertically upward from said base along substantially the entire vertical height of said partitioning means.

20. The device defined by claim 17, wherein said partitioning means defines each of said object-receiving regions by a pair of spaced apart object-receiving region-defining surfaces, and wherein each surface comprises three stabilizing fins projecting from said surface toward the center of said object-receiving region.

21. A device for storing a plurality of objects, such as dishes or the like, in a plurality of stacks in a plurality of object-receiving regions, said device comprising:
means for supporting said plurality of objects and including a generally rectangular base; and
means for partitioning the space extending above said supporting means into at least four object-receiving regions, wherein said partitioning means defines a pair of slits adjacent each object-receiving region, wherein said slits in each said pair are spaced substantially diametrically opposite from each other relative to one of said object-receiving region, wherein one said slit is positioned directly above each of at least two diagonally opposed corners of said base, wherein said partitioning means partitions the space extending above and surrounding the center of said supporting means into a central open region that coincides with one said object-receiving region, and wherein each said object-region has substantially the same size and shape.

22. The device defined by claim 21, wherein said partitioning means comprises a plurality of exterior partitions each forming an outer wall of said device and two interior partitions spaced from the outer edge of said supporting means, wherein each interior partition comprises four object-receiving region-defining surfaces, wherein each object-receiving region is defined by two object-receiving region-defining surfaces of different partitions, wherein said central open region is defined by object-receiving region-defining surfaces of said two interior partitions, wherein said plurality of exterior partitions comprises six exterior partitions, two of which are corner partitions which extend upwardly from opposite corners of said supporting means, and four of which are spaced from the other corners of said supporting means, wherein each of said four exterior non-corner partitions comprise two object-receiving region-defining surfaces, wherein each corner partition comprises one object-receiving region-defining surface, wherein each partition is spaced from the other partitions, and wherein each slit is formed by the space between said partitions.

23. The device defined by claim 21, wherein one of said slits in each pair of slits opens onto said central open region, wherein said slits in each pair are positioned diametrically opposite each other.

24. A device for storing a plurality of objects, such as dishes or the like, in a plurality of stacks at a plurality of object-receiving regions therein, said device comprising:
means for supporting said plurality of objects and including a generally rectangular base having four corners; and means for partitioning the space extending above said base into at least four object-receiving regions, wherein said partitioning means defines a pair of slits therein adjacent each of said object-receiving regions, wherein said slits in each said pair are spaced substantially diametrically opposite from each other relative to one said object-receiving region, wherein one said slit is positioned directly above each of at least two diagonally opposed corners of said base, wherein said partitioning means further defines one of a central open region and an object-receiving region above the partitioning means defining each said object-receiving region encloses about 60% of the lateral periphery of that said object-receiving region, and wherein said pair of slits together extend over no more than about 40% of the lateral periphery of that said object-receiving region.

25. The device defined by claim 24, wherein said partitioning means partitions the space above said supporting means into nine substantially vertically extending object-receiving regions.

26. The device defined by claim 25, wherein said partitioning means comprises a plurality of exterior partitions each forming an outer wall of said device and two interior partitions spaced from the outer edge of said supporting means, wherein each interior partition comprises four object-receiving region-defining surfaces, wherein each object-receiving region is defined by two object-receiving region-defining surfaces of different partitions, wherein said plurality of exterior partitions comprise six exterior partitions, two of which are corner partitions which extend upwardly from opposite corners of said supporting means, and four of which are spaced from the other corners of said supporting means, wherein each of said four exterior non corner partitions comprise two object-receiving region-defining surfaces, wherein each corner partition comprises one object-receiving region-defining surface, wherein each partition is spaced from the other partitions, and wherein each slit is formed by the space between said partitions.

27. The device defined by claim 24, wherein the portion of said partitioning means defining each object-receiving region encloses about 75% of the lateral periphery of each object-receiving region, and wherein each pair of slits of that said object-receiving region together extend over no more than about 25% of the lateral periphery of each object-receiving region.

28. The device defined by claim 27, wherein said partitioning means comprises four partitions each having two object-receiving region-defining surfaces, wherein each object-receiving region is defined by a pair of object-receiving region-defining surfaces of different partitions, wherein said partitioning means further forms a central open region, wherein each partition is generally T-shaped having first and second portions, wherein said first portion forms an outer wall of said device, wherein said second portion comprises said two object-receiving region-defining surfaces, wherein an interior end of said second portion of each partition borders on said central open region formed by said partitioning means and is spaced a distance from an axis perpendicular to said supporting means and extending through the center of said supporting means, wherein said interior ends of a pair of second portions of said pair of object-receiving region-defining surfaces are spaced apart from each other, wherein the space between said interior ends of said pair of second portions of said pair of object-receiving region-defining surfaces forms one of said slits in each pair of slits in each object-receiving region, wherein each of said pairs of object-receiving region-defining surfaces comprises a pair of exterior ends of said second portions, and wherein said pair of exterior ends are spaced apart to form the other of said slits in each pair of slits in each object-receiving region.

29. A device for storing a plurality of objects, such as dishes or the like, in a plurality of stacks at a plurality of object-receiving regions, said device comprising:

means for supporting said plurality of objects and including a generally rectangular base having four corners; and means for partitioning the space extending above said supporting means into only nine object-receiving regions, one of which extends through and surrounds an axis perpendicular to said base and extending through the center of said supporting base, wherein said partitioning means has a pair of slits diametrically opposed to each other in each object-receiving region and wherein one of said slits is positioned directly above each of two diagonally opposed corners of said base.

30. The device defined by claim 29, wherein each object-receiving region is substantially the same size and shape.

31. The device defined by claim 29, wherein said slits in each pair of slits are diametrically opposite one another in each object-receiving region.

32. The device defined by claim 29, wherein said supporting and partitioning means comprise one unitary body.

33. The device defined by claim 29, wherein said partitioning means comprises a plurality of exterior partitions forming outer walls of said device and two interior partitions spaced from the outer edge of said supporting means, wherein each interior partition comprises four object-receiving region-defining surfaces, wherein each object-receiving region is defined by two object-receiving region-defining surfaces of different partitions, wherein said central open region is defined by object-receiving region-defining surfaces of said two interior partitions, wherein said plurality of exterior partitions comprise six exterior partitions, two of which are corner partitions which extend upwardly from opposite corners of said supporting means, and four of which are spaced from the other corners of said supporting means, wherein each of said four exterior non-corner partitions comprise two object-receiving region-defining surfaces, wherein each corner partition comprises one object-receiving region-defining surface, wherein each partition is spaced from the other partitions, and wherein each slit is formed by the space between said partitions.

34. The device defined by claim 29, wherein said partitioning means comprises stabilizing means for stabilizing a stack of objects stacked in said object receiving regions, wherein said partitioning means comprises a plurality of object-receiving region-defining surfaces, wherein said stabilizing means comprises a plurality of stabilizing fins projecting from said surfaces toward a longitudinal axis extending through the center of each object-receiving region.

35. A device for storing a plurality of objects, such as dishes or the like, in a plurality of stacks at a plurality of object-receiving regions, said device comprising:

means for supporting said plurality of objects including a generally rectangular base having four corners; and means for partitioning the space extending above said supporting means into only nine object-receiving regions, each of which has substantially the same size and shape, wherein said partitioning means defines a pair of slits adjacent each object-receiving region, wherein said slits in each said pair are spaced substantially diametrically opposite from each other relative to one said object-receiving region, wherein one said slit is positioned directly above each of at least two diagonally opposed corners of said base, and wherein said partitioning means further defines one of a central open region and an object-receiving region above the center of said base.

36. The device defined by claim 35, wherein said partitioning and supporting means comprise one unitary body.

37. The device defined by claim 35, wherein said partitioning means comprises a plurality of exterior partitions forming outer walls of said device and two interior partitions spaced from the outer edge of said supporting means, wherein each interior partition comprises four object-receiving region-defining surfaces, wherein each object-receiving region is defined by two object-receiving region-defining surfaces of different partitions, wherein said plurality of exterior partitions comprise six exterior partitions, two of which are corner partitions which extend upwardly from opposite corners of said supporting means, and four of which are spaced from the other corners of said supporting means, wherein each of said four exterior non corner partitions comprise two object-receiving region-defining surfaces, wherein each corner partition comprises one object-receiving region-defining surface, wherein each partition is spaced from the other partitions, and wherein each slit is formed by the space between said partitions.

38. The device defined by claim 35, wherein said partitioning means comprises stabilizing means for stabilizing a stack of objects stored in said object-receiving regions, wherein said partitioning means comprises a plurality of object-receiving region-defining surfaces, wherein said stabilizing means comprises a plurality of stabilizing fins projecting from each object-receiving region-defining surface toward a longitudinal axis extending through the center of each object-receiving region.

39. A device for storing a plurality of objects, such as dishes or the like, in a plurality of stacks in a plurality of object-receiving regions, said device comprising:

means for supporting said plurality of objects and including a generally rectangular base; and means for partitioning the space extending above said supporting means into at least four object-receiving regions, wherein said partitioning means defines a pair slits adjacent each object-receiving region, wherein said slits in each said pair are spaced substantially diametrically opposite from each other relative to one said object-receiving region, wherein one said slit is positioned directly above each of at least two diagonally opposed corners of said base, and wherein said partitioning means partitions the space extending above and surrounding the center of said supporting means into a central open region, said partitioning means further comprising four partition each having two object-receiving region-defining surfaces, wherein each object-receiving region is defined by a pair of object-receiving region-defining surfaces of different partitions, wherein each partition is generally T-shaped having first and second portions, wherein said first portion forms an outer wall of said device, wherein said second portion comprises said two object-receiving region-defining surfaces, wherein an interior end of said second portion of each partition borders on said central open region and is spaced a distance from an axis perpendicular to said supporting means and extending through the center of said supporting means, wherein said interior ends of each pair of said second portions of each pair of object-receiving region-defining surfaces are spaced apart from each other, wherein the space between said interior ends of each pair of second portions of each pair of object-receiving region-defining surfaces forms one of said slits in each pair of slits in each object-receiving region, and wherein the exterior ends of each pair of second portions of each pair of object-receiving region-defining surfaces are spaced apart to form the other of said slits in each pair of slits in each object-receiving region.

40. A system storing a plurality of dishes in a plurality of stacks each at a dish-receiving region therein, said system comprising:

a plurality of dishes;

means for supporting said plurality of dishes and including a generally rectangular base having four corners; and means for partitioning the space extending above said base into at least four dish-receiving regions, wherein said partitioning means defines a pair of slits therein adjacent each said dish-receiving region, wherein said slits in each said pair are spaced substantially diametrically opposite from each other relative to one said dish-receiving region, and wherein one said slit is positioned directly above each of at least two diagonally opposed corners of said base, said partitioning means further defining one of a central open region and a dish-receiving region above the center of said base.

41. A system storing a plurality of objects, such as dishes or the like, in a plurality of stacks each at an object-receiving region therein, said system comprising:

a plurality of objects;

means for supporting said plurality of objects and including a generally rectangular base having four corners; and means for partitioning the space extending above said base into at least four object-receiving regions, wherein said partitioning means defines a pair of slits therein adjacent each said object-receiving region, wherein said slits in each said pair are spaced substantially diametrically opposite from each other relative to one said object-receiving region, and wherein one said slit is positioned directly above each of at least two diagonally opposed corners of said base, said partitioning means further defining one of a central open region and an object-receiving region above the center of said base, wherein said one of said central open region and said object-receiving region above the center of said base has substantially the same shape as said at least one of four object-receiving regions.

* * * * *

UNITED STATES PATENT AND TRADEMARK OFFICE
CERTIFICATE OF CORRECTION

PATENT NO. : 4,957,206  Page 1 of 4
DATED : September 18, 1990
INVENTOR(S) : RONALD C. BANKO, ET AL.

It is certified that error appears in the above-identified patent and that said Letters Patent is hereby corrected as shown below:

COLUMN 1

Line 17, "dish or saucer shaped" should read --dish- or saucer-shaped--.
Line 35, "column like" should read --column-like--.
Line 39, "time consuming" should read --time-consuming--.
Line 62, "column like" should read --column-like--.
Line 66, "sam(" should read --same--.

COLUMN 2

Line 2, "one piece double wall" should read --one-piece double-wall--.
Line 4, "dish(s" should read --dishes--.
Line 11, "cross" should read --cross- --.

COLUMN 4

Line 1, "cross shaped" should read --cross-shaped--.
Line 39, "cross sectional" should read --cross-sectional--.
Line 65, "will adapted" should read --well adapted--.

COLUMN 5

Line 16, "dish or saucer like" should read --dish- or saucer-like--.
Line 26, "one piece" should read --one-piece--.
Line 30, "this scope of the invention" should read --the scope of this invention--.

UNITED STATES PATENT AND TRADEMARK OFFICE
CERTIFICATE OF CORRECTION

PATENT NO. : 4,957,206

DATED : September 18, 1990

INVENTOR(S) : RONALD C. BANKO, ET AL.

It is certified that error appears in the above-identified patent and that said Letters Patent is hereby corrected as shown below:

COLUMN 7

Line 2, "slot 62" should read --slit 62--.
Line 4, "slot 60" should read --slit 60--.
Line 49, "a" should be deleted and "tray" should read --rack--.
Line 66, "one piece double wall" should read --one-piece double-wall--.
Line 67, "foamed-in placed" should read --foamed-in-place--.

COLUMN 8

Line 60, "cross shaped" should read --cross-shaped--.

COLUMN 9

Line 27, "cross shaped" shold read --cross-shaped--.
Line 32, "base 12" should read --base 112--.
Line 33, "base 12" should read --base 112.--
Line 48, "teh" should read --the--.
Line 52, "have described" should read --have been described--.
Line 64, "corners, and" should read ---corners; and--.

COLUMN 10

Line 26, "claimed" should read --defined--.
Line 28, "enclosed" should read --encloses--.

UNITED STATES PATENT AND TRADEMARK OFFICE
CERTIFICATE OF CORRECTION

PATENT NO. : 4,957,206
DATED : September 18, 1990
INVENTOR(S) : RONALD C. BANKO, ET AL.

It is certified that error appears in the above-identified patent and that said Letters Patent is hereby corrected as shown below:

COLUMN 11

Line 13, "objectreceiving" should read
        --object-receiving--.

COLUMN 12

Line 6, "upward" should read --upwardly--.
    Line 26, "of" should be deleted.
    Line 33, "object-" should read --object-receiving--.

COLUMN 13

Line 12, "the partition-" should read
        --the center of said base, and wherein the portion of said partition--.
    Line 36, "non" should read --non- --.

COLUMN 14

Line 20, "supporting base," should read --base,--.
    Line 59, "object receiv-" should read
        --object-receiv- --.

UNITED STATES PATENT AND TRADEMARK OFFICE
CERTIFICATE OF CORRECTION

PATENT NO. : 4,957,206
DATED : September 18, 1990
INVENTOR(S) : RONALD C. BANKO, ET AL.

It is certified that error appears in the above-identified patent and that said Letters Patent is hereby corrected as shown below:

COLUMN 15

Line 33, "non corner" should read --non-corner--.
Line 57, "pair slits" should read --pair of slits--.

Signed and Sealed this

Twenty-ninth Day of September, 1992

Attest:

DOUGLAS B. COMER

*Attesting Officer*    *Acting Commissioner of Patents and Trademarks*